Feb. 4, 1941.   G. F. WHITMAN   2,230,662
MILLING CUTTER
Filed May 24, 1939

INVENTOR
George F. Whitman
BY
ATTORNEYS

Patented Feb. 4, 1941

2,230,662

UNITED STATES PATENT OFFICE 2,230,662

MILLING CUTTER

George F. Whitman, Rockford, Ill., assignor to Barber-Colman Company, Rockford, Ill., a corporation of Illinois Application May 24, 1939, Serial No. 275,352

8 Claims. (Cl. 29—105)

The invention relates to milling cutters and more particularly to improvements in interlocking milling cutters, the invention being especially applicable to interlocking side milling cutters.

Interlocking side milling cutters heretofore available have usually embodied two disk shaped sections secured together in face-to-face relation by interlocking projections on them, and each having a series of radially extending teeth presenting peripheral cutting edges and with all or part of the teeth presenting side cutting edges. Such cutters are particularly well adapted for deep slotting work where the slot width is to be held to close limits. The interlocking feature makes possible the accurate maintenance of width even after sharpening, and also spreading, of the cutter for use in different widths of cuts. In such cutters heretofore available, however, the peripheral cutting edges of corresponding teeth on the two sections have been angularly disposed with respect to each other, thereby forming pockets which obstruct free chip flow which results in breakage.

The general object of the present invention is to provide an improved interlocking milling cutter embodying a novel tooth arrangement of such character that a free flow of chips is obtained, there being no pockets in the cutter periphery which tend to collect chips and cause breakage of the cutter.

A more specific object is to provide an interlocking milling cutter of the type embodying two interlocked and axially alined sections with a series of teeth on the periphery of each, and in which a free flow of chips is achieved by forming generally spirally arranged peripheral cutting edges on the teeth of each section and with the peripheral cutting edge of each tooth in one section spiraling in the same direction as that on a corresponding tooth on the other section and generally alined with it.

Further objects and advantages of the invention will become apparent as the following description proceeds, taken in connection with the accompanying drawing in which.

Figure 1:
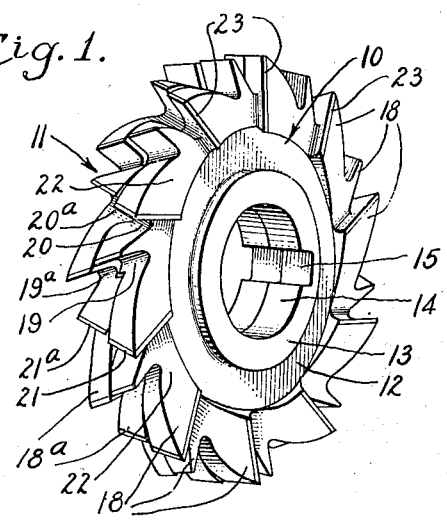
Figure 1 is a perspective view of an interlocking side milling cutter embodying the invention.

For purposes of exemplification, the invention has been disclosed herein as embodied in an interlocking side milling cutter (Fig. 1) suitable for cutting slots or grooves. It will be understood, however, that the invention may be embodied in cutters of various other specific forms. Accordingly, even though one particular embodiment of the invention has been shown and described in some detail, there is no intention to thereby limit the invention to such embodiment, but, on the other hand, the appended claims are intended to cover all modifications and alterative constructions falling within the spirit and scope of the invention.

Figure 2:
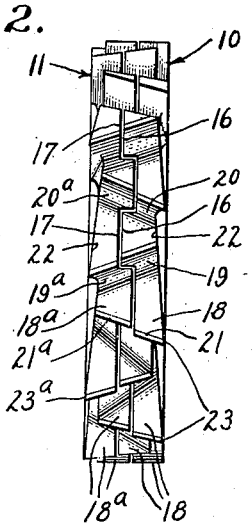
Fig. 2 is a front elevation of the cutter of Fig. 1.

In the illustrative construction (Fig. 1) the cutter shown comprises two axially alined disk shaped sections, designated generally as 10 and 11. The section 10 has a web body 12 and a hub portion 13 in which is formed a mounting bore 14 provided with a keyway 15. The other section 11 is similarly constituted. The two sections are ganged together, i. e., keyed on a common arbor (not shown) in side-by-side relation. To permit adjustment of the cutter width by shifting the sections axially with respect to each other, the two sections 10 and 11 are secured together by the usual form of interfitting projections commonly used in interlocking side milling cutters. In particular, a series of radially extending ribs 16 (Fig. 2) are fashioned on the inner face of the section 10 and these ribs are received in mating grooves 17 in the other section 11.

The periphery of each of the cutter sections 10 and 11 is provided with a series of teeth so arranged with respect to the teeth on the other section that there will be no pockets formed between them in which chips may become lodged. To minimize chattering and vibration at high speeds the peripheral cutting edges on the successive teeth of each section are spiraled in opposite directions. This gives a positive cutting edge to the side teeth. In the illustrative construction the teeth 18 on the section 10 are defined by two sets of gashes 19 and 20 alternating with each other and spiraled in opposite directions. On the other section 11 two corresponding sets of gashes 19ª and 20ª define corresponding teeth 18ª, the sets of gashes on the section 11 being alined with and spiraled in the same direction as the corresponding gashes on the section 10.

Peripheral cutting edges 21 and 21ª on the teeth 18 and 18ª respectively are formed by suitably relieving the tops of the teeth. In this way peripheral cutting edges are formed on the cutter structure which spiral alternately in right and left hand directions and which in each case extend substantially across the entire cutter. Upon reference to Fig. 2 it will be seen that the cutting edges are so located that the leading one of each of the generally alined pairs of cutting edges is displaced slightly in advance of the other cutting edge in the pair. This further prevents chip clogging in the event of variations in axial displacement of the two cutter sections upon adjustments for different widths of slots.

In order to accommodate proper cutting with the sections 10 and 11 shimmed apart in the usual way for adjustment of the width of cut, the teeth on each section are arranged in staggered relation. For this purpose chip clearance bevels 22 (Fig. 1) are formed on the opposite sides of alternate teeth.

Side cutting edges 23 are fashioned on the outer sides of alternate teeth of the section 10 by suitably grinding and relieving the same. Similar side cutting edges 23ᵃ (Fig. 2) are also formed on the outer sides of alternate teeth on the other section 11. These side cutting edges project laterally of the hubs 12 so as to accommodate the cutting of deep slots.

With the construction described above it will be apparent that the cutter has no peripheral pockets. The chips which are formed flow freely from the matching alternate left and right hand spiral cutting edges on the two sections so that breakage is minimized.

I claim as my invention:

1. An interlocking milling cutter comprising, in combination, a pair of disk shaped sections arranged side by side in axial alinement, said sections being provided with interfitting projections on the adjacent faces thereof, each of said sections having a series of radially projecting teeth thereon with a peripheral cutting edge fashioned on each tooth, said cutting edges being alternately spiraled in opposite directions, and each of the cutting edges on the teeth of one of said sections being spiraled in the same direction as the corresponding cutting edges on the teeth of the other section and generally alined therewith.

2. An interlocking milling cutter comprising, in combination, a pair of disk shaped sections arranged side by side in axial alinement, said sections being provided with interfitting projections on the adjacent side faces thereof, each of said sections having a series of radially projecting teeth thereon with a peripheral cutting edge fashioned on each tooth, and each of the cutting edges on the teeth of one of said sections being generally alined with and forming in effect a continuation of the corresponding cutting edges on the teeth of the other section.

3. An interlocking milling cutter of the type embodying two axially alined disk shaped sections having equal numbers of peripheral teeth thereon and having interfitting projections on the adjacent faces of the sections, characterized by the provision of a generally spiraled peripheral cutting edge on each tooth fashioned so that each such cutting edge on the teeth of one of the sections spirals in the same direction as the edge on the corresponding tooth on the other section.

4. An interlocking milling cutter comprising, in combination, a pair of disk shaped sections arranged side by side in axial alinement, each of said sections having a series of radially projecting teeth thereon with a peripheral cutting edge fashioned on each tooth, said cutting edges being alternately spiraled in opposite directions and each of the cutting edges on the teeth of one of said sections being spiraled in the same direction as the corresponding cutting edges on the teeth of the other section and generally alined therewith, the teeth on each section being staggered with respect to each other, and alternate teeth on each section being located with a part of the cutting edge thereon overlapping the path traversed by the next succeeding tooth on the other section during rotation of the cutter.

5. An interlocking milling cutter comprising, in combination, a pair of axially alined disk shaped sections, means fashioned on the abutting faces of said sections for interlocking the same, said sections having two sets of gashes formed on their peripheries and spiraled in opposite directions and with each of the gashes extending across both sections, said gashes defining peripheral spiraled cutting edges extending across both sections and with successive ones of the cutting edges spiraled in the opposite direction with respect to the next adjacent cutting edges, and the cutting edges on each section being staggered with respect to each other with a part of each alternate one of the cutting edges overlapping the path traversed by the next succeeding cutting edge on the other section during rotation of the cutter.

6. An interlocking milling cutter comprising, in combination, a pair of axially alined disk shaped sections, means fashioned on the abutting faces of said sections for interlocking the same, said sections having two sets of gashes formed on their peripheries and spiraled in opposite directions and with each of the gashes extending across both sections, said gashes defining peripheral spiraled cutting edges extending across both sections, and the leading portion of each cutting edge being offset slightly ahead of the trailing portion of the cutting edge on the adjacent section.

7. An interlocking side milling cutter comprising, in combination, a pair of disk shaped sections arranged side by side in axial alinement, interfitting projections on the adjacent side faces of said sections, each of said sections having a series of radially projecting teeth thereon with a peripheral cutting edge fashioned on each tooth, each of the cutting edges on the teeth of one of said sections being generally alined with corresponding cutting edges on the teeth of the other section, and at least a part of said teeth on both sections having side cutting edges fashioned on the outer sides thereof.

8. An interlocking side milling cutter comprising, in combination, a pair of disk shaped sections arranged side by side in axial alinement, interfitting projections on the adjacent side faces of said sections, each of said sections having a series of radially projecting teeth thereon staggered with respect to each other and with a peripheral cutting edge fashioned on each tooth, said cutting edges being alternately spiraled in opposite directions, each of the cutting edges on the teeth of one of said sections being spiraled in the same direction as the corresponding cutting edges on the teeth of the other section and generally alined therewith, and the outwardly projecting side portions of said teeth having side cutting edges formed thereon.

GEORGE F. WHITMAN.